(12) United States Patent
Kim

(10) Patent No.: US 10,755,504 B1
(45) Date of Patent: Aug. 25, 2020

(54) METHOD FOR CONTROLLING VEHICLE BASED ON LOCATION INFORMATION AND VEHICLE-CONTROL SUPPORTING SERVER USING THE SAME

(71) Applicant: Junha Kim, Irvine, CA (US)

(72) Inventor: Junha Kim, Irvine, CA (US)

( * ) Notice: Subject to any disclaimer, the term of this patent is extended or adjusted under 35 U.S.C. 154(b) by 0 days.

(21) Appl. No.: 16/861,665

(22) Filed: Apr. 29, 2020

(51) Int. Cl.
*G07C 9/00* (2020.01)
*H04L 9/32* (2006.01)
*H04L 29/06* (2006.01)

(52) U.S. Cl.
CPC ........ *G07C 9/00309* (2013.01); *H04L 9/3247* (2013.01); *H04L 9/3263* (2013.01); *H04L 63/0861* (2013.01)

(58) Field of Classification Search
CPC ............ G07C 9/00309; H04L 63/0861; H04L 9/3247; H04L 9/3263; B60R 25/209
See application file for complete search history.

(56) References Cited

U.S. PATENT DOCUMENTS

| 9,875,589 B1* | 1/2018 | Buttolo | G07C 9/00174 |
| 10,200,585 B2* | 2/2019 | Ichikawa | G03B 15/00 |
| 2016/0098871 A1* | 4/2016 | Oz | G01S 19/42 340/5.61 |
| 2018/0262891 A1* | 9/2018 | Wu | G07C 9/00857 |

* cited by examiner

*Primary Examiner* — Nabil H Syed
(74) *Attorney, Agent, or Firm* — Xsensus LLP

(57) ABSTRACT

A method for controlling a vehicle based on location information is provided. The method includes steps of: a vehicle-control supporting server (a) if authentication information, issuance information on a user device certificate and on a vehicle device certificate, the user device certificate, a digital signature, and the vehicle device certificate have been stored, and if a request is acquired, verifying vehicle device information, the vehicle device certificate, user device information, and the user device certificate, determining whether the request is from a user device within a controllable distance and whether the vehicle's change of a location is within a range, and (b) if the certificates are valid, if the request is from the user device, if the user device is within the controllable distance, and if the change is within the range, then transmitting control-authorizing information to the user device and the vehicle device to execute a device command.

20 Claims, 4 Drawing Sheets

METHOD FOR CONTROLLING VEHICLE BASED ON LOCATION INFORMATION AND VEHICLE-CONTROL SUPPORTING SERVER USING THE SAME

FIELD OF THE DISCLOSURE

The present disclosure relates to a method for controlling a vehicle based on location information and a vehicle-control supporting server using the same; and more particularly, to the method for controlling the vehicle based on location information on a user device and on the vehicle by using the user device and the vehicle-control supporting server using the same.

BACKGROUND OF THE DISCLOSURE

To remotely control a vehicle, various ways are used such as controlling the vehicle using a smart key, controlling the vehicle using a telematics service, and controlling the vehicle by generating a digital key using a separate security module of the vehicle.

However, in the case of controlling the vehicle using the smart key, it is difficult to communicate with the vehicle using equipment other than a designated smart key.

In addition, in the case of controlling the vehicle using the telematics service, it takes a considerable amount of time to prepare the vehicle for control, and it is difficult to control the vehicle when the vehicle does not support network communication.

Also, in the case of controlling the vehicle using the digital key, since a separate vehicle-specific communication module, i.e., an IAU, must be installed in the vehicle, high cost is required to generate and manage the digital key, and it is difficult to generate and manage the digital key in an automotive aftermarket.

Further, conventionally, vehicles have been out of the security chain, thus the vehicles have been vulnerable to attacks from malicious third parties, such as replay attacks.

Therefore, an improvement for solving the above problems is required.

SUMMARY OF THE DISCLOSURE

It is an object of the present disclosure to solve all the aforementioned problems.

It is another object of the present disclosure to support quick control of a vehicle using Bluetooth modules included in the vehicle and a user device.

It is still another object of the present disclosure to support the control of the vehicle even if the vehicle does not support network communication.

It is still yet another object of the present disclosure to allow easy access to vehicle-related services in an aftermarket.

It is still yet another object of the present disclosure to reduce cost of generating and managing keys.

It is still yet another object of the present disclosure to incorporate the vehicle into a security chain by using location information of the vehicle.

In accordance with one aspect of the present disclosure, there is provided a method for controlling a vehicle based on location information, including steps of: (a) on condition that (i) authentication information, and issuance information on a 1-st user device certificate, and issuance information on a 1-st vehicle device certificate have been stored in a vehicle-control supporting server wherein the authentication information includes 1-st vehicle device information, 1-st vehicle location information, 1-st authentication-time information, 1-st user device information, 1-st user-device location information, 1-st user-device time information, and 1-st server time information, (ii) the 1-st user device certificate issued from the vehicle-control supporting server and a 1-st digital signature corresponding to the 1-st user device certificate have been stored in the user device, and (iii) the 1-st vehicle device certificate has been stored in a vehicle device of the vehicle, and then if an authentication request is acquired from the user device wherein the authentication request includes (1) the 1-st vehicle device certificate, the 1-st vehicle device information, 1-st current vehicle-location information, and 1-st current authentication-time information received from the vehicle device in response to a vehicle-controlling command of the user device and (2) the 1-st digital signature, the 1-st user device certificate, the 1-st user device information, 1-st current location information on the user device, and 1-st current time information on the user device, the vehicle-control supporting server performing a process of verifying the 1-st vehicle device information and the 1-st vehicle device certificate by referring to the issuance information on the 1-st vehicle device certificate, a process of verifying the 1-st user device information and the 1-st user device certificate by referring to the issuance information on the 1-st user device certificate, a process of determining whether the authentication request is acquired from the user device which is valid by referring to the 1-st digital signature, a process of determining whether the user device is within a controllable distance from the vehicle by referring to the 1-st current vehicle-location information and the 1-st current location information on the user device, and a process of determining whether a change of a location of the vehicle is within a specific range by referring to the 1-st vehicle location information, the 1-st authentication-time information, the 1-st current vehicle-location information, and the 1-st current authentication-time information; and (b) (i) if the 1-st vehicle device certificate and the 1-st user device certificate are determined as valid, (ii) if the authentication request is determined as acquired from the user device which is valid, (iii) if the user device is determined as within the controllable distance from the vehicle, and (iv) if the change of the location of the vehicle is determined as within the specific range, then the vehicle-control supporting server performing a process of transmitting control-authorizing information to the user device, to thereby allow the user device to transmit the control-authorizing information to the vehicle device and thus allow the vehicle device to execute a device command corresponding to the vehicle-controlling command according to the control-authorizing information.

As one example, before the step of (a), the method further includes a step of: (a0) if an issuance request is acquired from the user device wherein the issuance request includes (1) the 1-st vehicle device information, the 1-st vehicle location information, and the 1-st authentication-time information received from the vehicle device in response to a vehicle-information request by the user device and (2) the 1-st user device information, the 1-st user-device location information, and the 1-st user-device time information, the vehicle-control supporting server performing (i) a process of determining whether the user device is located in the vehicle by referring to the 1-st vehicle location information and the 1-st user-device location information, (ii) if the user device is determined as located in the vehicle, a process of storing the authentication information in the vehicle-control supporting server wherein the authentication information includes the 1-st vehicle device information, the 1-st vehicle location information, the 1-st authentication-time information, the 1-st user device information, the 1-st user-device location information, the 1-st user-device time information, and the 1-st server time information, (iii) a process of generating and transmitting the 1-st user device certificate, the 1-st digital signature corresponding to the 1-st user device certificate, and the 1-st vehicle device certificate to the user device, to thereby allow the user device to store in the user device the 1-st user device certificate and the 1-st digital signature, allow the user device to transmit the 1-st vehicle device certificate to the vehicle device, and allow the vehicle device to store the 1-st vehicle device certificate.

As one example, at the step of (a), on condition that a 1-st unique distance to be used for controlling the vehicle has further been set, (i) if the user device moves inward from outside the 1-st unique distance away from the vehicle, the user device generates and transmits a door-opening command to the vehicle device as the vehicle-controlling command, or (ii) if the user device moves outward from inside the 1-st unique distance, the user device generates and transmits a door-locking command to the vehicle device as the vehicle-controlling command.

As one example, the method further includes a step of: (c1) the vehicle-control supporting server performing a process of cross-validating a distance between the vehicle and the user device by referring to the 1-st current vehicle-location information and the 1-st current location information on the user device, and in case the vehicle is determined as moving even if the 1-st current vehicle-location information and the 1-st current location information on the user device have been changed, a process of determining the authentication information as valid. As one example, the method further includes a step of: (c2) the vehicle-control supporting server performing (i) a process of acquiring from the user device 2-nd current vehicle-location information, 2-nd vehicle device information, 2-nd user-device location information, and 2-nd user device information, (ii) a process of cross-validating a distance between the vehicle and the user device by referring to the 2-nd current vehicle-location information and the 2-nd current location information on the user device, (iii) if the 2-nd current vehicle-location information is determined as different from the 1-st vehicle location information included in the authentication information, a process of comparing the 2-nd vehicle device information and the 2-nd user device information with the 1-st vehicle device information and the 1-st user device information included in the authentication information, (iv) a process of determining the authentication information as valid if the 2-nd vehicle device information and the 2-nd user device information are determined as respectively identical to the 1-st vehicle device information and the 1-st user device information included in the authentication information and (v) a process of updating the 1-st vehicle location information, the 1-st authentication-time information, the 1-st user-device location information, the 1-st user-device time information, and the 1-st server time information included in the authentication information.

As one example, the method further includes a step of: (d) if an issuance request for another certificate to be used for the vehicle is acquired from another user device, the vehicle-control supporting server performing (i) a process of transmitting a confirmation request to the user device, and (ii) if authorization information corresponding to the confirmation request is acquired from the user device, a process of determining whether said another user device is located in the vehicle by referring to the 1-st vehicle location information and location information on said another user device, (iii) if said another user device is determined as located in the vehicle, a process of storing another-authentication information in the vehicle-control supporting server wherein said another-authentication information includes the 1-st vehicle device information, the 1-st vehicle location information, the 1-st authentication-time information, another-user device information on said another user device, the location information on said another user device, time information on said another user device, and the 1-st server time information, and (iv) a process of generating and transmitting another user device certificate, another digital signature corresponding to said another user device certificate, and the 1-st vehicle device certificate to said another user device, to thereby allow said another user device to store in said another user device said another user device certificate and said another digital signature, allow said another user device to transmit the 1-st vehicle device certificate to the vehicle device and allow the vehicle device to store the 1-st vehicle device certificate.

As one example, before the step of (d), the method further includes a step of: (d0) on condition that current limit information on a registrable quantity has been set which represents the registrable quantity of appendable user devices including said another user device, if modified limit information to be used for updating the current limit information on the registrable quantity is acquired from the user device, the vehicle-control supporting server performing a process of updating the current limit information on the registrable quantity by referring to the modified limit information.

As one example, at the step of (a), on condition that 1-st biometric authentication information of a user of the user device has been further registered with the vehicle, if 2-nd biometric authentication information of the user is further acquired from the user device, the vehicle-control supporting server performs a process of comparing the 1-st biometric authentication information stored in the vehicle-control supporting server with the 2-nd biometric authentication information, to thereby determine whether the user device is authorized to control the vehicle.

As one example, at the step of (b), if a 2-nd digital signature acquired from the user device is determined as invalid by comparing a creation time of the 1-st digital signature with a time stamp included in the 2-nd digital signature, the vehicle-control supporting server performs a process of blocking the 2-nd digital signature determined as invalid.

As one example, at the step of (a), the vehicle-control supporting server performs (i) a process of acquiring an expiration date of the 1-st user device certificate and that of the 1-st vehicle device certificate by referring to the issuance information on the 1-st user device certificate and the issuance information on the 1-st vehicle device certificate, and (ii) if at least one of the expiration date of the 1-st user device certificate and the expiration date of the 1-st vehicle device certificate is determined as requiring renewal, a process of allowing the user device to transmit a re-issuance request for the 1-st user device certificate or the 1-st vehicle device certificate to the vehicle-control supporting server.

In accordance with another aspect of the present disclosure, there is provided a vehicle-control supporting server for controlling a vehicle based on location information, including: at least one memory that stores instructions; and at least one processor configured to execute the instructions to perform: (I) on condition that (i) authentication information, issuance information on a 1-st user device certificate, and issuance information on a 1-st vehicle device certificate have been stored in the vehicle-control supporting server wherein the authentication information includes 1-st vehicle device information, 1-st vehicle location information, 1-st authentication-time information, 1-st user device information, 1-st user-device location information, 1-st user-device time information, and 1-st server time information, (ii) the 1-st user device certificate issued from the vehicle-control supporting server and a 1-st digital signature corresponding to the 1-st user device certificate have been stored in the user device, and (iii) the 1-st vehicle device certificate has been stored in a vehicle device of the vehicle, and then if an authentication request is acquired from the user device wherein the authentication request includes (1) the 1-st vehicle device certificate, the 1-st vehicle device information, 1-st current vehicle-location information, and 1-st current authentication-time information received from the vehicle device in response to a vehicle-controlling command of the user device and (2) the 1-st digital signature, the 1-st user device certificate, the 1-st user device information, 1-st current location information on the user device, and 1-st current time information on the user device, a process of verifying the 1-st vehicle device information and the 1-st vehicle device certificate by referring to the issuance information on the 1-st vehicle device certificate, a process of verifying the 1-st user device information and the 1-st user device certificate by referring to the issuance information on the 1-st user device certificate, a process of determining whether the authentication request is acquired from the user device which is valid by referring to the 1-st digital signature, a process of determining whether the user device is within a controllable distance from the vehicle by referring to the 1-st current vehicle-location information and the 1-st current location information on the user device, and a process of determining whether a change of a location of the vehicle is within a specific range by referring to the 1-st vehicle location information, the 1-st authentication-time information, the 1-st current vehicle-location information, and the 1-st current authentication-time information, and (II) (i) if the 1-st vehicle device certificate and the 1-st user device certificate are determined as valid, (ii) if the authentication request is determined as acquired from the user device which is valid, (iii) if the user device is determined as within the controllable distance from the vehicle, and (iv) if the change of the location of the vehicle is determined as within the specific range, then a process of transmitting control-authorizing information to the user device, to thereby allow the user device to transmit the control-authorizing information to the vehicle device and thus allow the vehicle device to execute a device command corresponding to the vehicle-controlling command according to the control-authorizing information.

As one example, before the process of (I), the processor further performs: (I-0) if an issuance request is acquired from the user device wherein the issuance request includes (1) the 1-st vehicle device information, the 1-st vehicle location information, and the 1-st authentication-time information received from the vehicle device in response to a vehicle-information request by the user device and (2) the 1-st user device information, the 1-st user-device location information, and the 1-st user-device time information, (i) a process of determining whether the user device is located in the vehicle by referring to the 1-st vehicle location information and the 1-st user-device location information, (ii) if the user device is determined as located in the vehicle, a process of storing the authentication information in the vehicle-control supporting server wherein the authentication information includes the 1-st vehicle device information, the 1-st vehicle location information, the 1-st authentication-time information, the 1-st user device information, the 1-st user-device location information, the 1-st user-device time information, and the 1-st server time information, (iii) a process of generating and transmitting the 1-st user device certificate, the 1-st digital signature corresponding to the 1-st user device certificate, and the 1-st vehicle device certificate to the user device, to thereby allow the user device to store in the user device the 1-st user device certificate and the 1-st digital signature, allow the user device to transmit the 1-st vehicle device certificate to the vehicle device, and allow the vehicle device to store the 1-st vehicle device certificate.

As one example, at the process of (I), on condition that a 1-st unique distance to be used for controlling the vehicle has further been set, (i) if the user device moves inward from outside the 1-st unique distance away from the vehicle, the user device generates and transmits a door-opening command to the vehicle device as the vehicle-controlling command, or (ii) if the user device moves outward from inside the 1-st unique distance, the user device generates and transmits a door-locking command to the vehicle device as the vehicle-controlling command.

As one example, the processor further performs: (III-1) a process of cross-validating a distance between the vehicle and the user device by referring to the 1-st current vehicle-location information and the 1-st current location information on the user device, and in case the vehicle is determined as moving even if the 1-st current vehicle-location information and the 1-st current location information on the user device have been changed, a process of determining the authentication information as valid.

As one example, the processor further performs: (III-2) (i) a process of acquiring from the user device 2-nd current vehicle-location information, 2-nd vehicle device information, 2-nd user-device location information, and 2-nd user device information, (ii) a process of cross-validating a distance between the vehicle and the user device by referring to the 2-nd current vehicle-location information and the 2-nd current location information on the user device, (iii) if the 2-nd current vehicle-location information is determined as different from the 1-st vehicle location information included in the authentication information, a process of comparing the 2-nd vehicle device information and the 2-nd user device information with the 1-st vehicle device information and the 1-st user device information included in the authentication information, (iv) a process of determining the authentication information as valid if the 2-nd vehicle device information and the 2-nd user device information are determined as respectively identical to the 1-st vehicle device information and the 1-st user device information included in the authentication information and (v) a process of updating the 1-st vehicle location information, the 1-st authentication-time information, the 1-st user-device location information, the 1-st user-device time information, and the 1-st server time information included in the authentication information.

As one example, the processor further performs: (IV) if an issuance request for another certificate to be used for the vehicle is acquired from another user device, (i) a process of transmitting a confirmation request to the user device, and (ii) if authorization information corresponding to the confirmation request is acquired from the user device, a process of determining whether said another user device is located in the vehicle by referring to the 1-st vehicle location information and location information on said another user device, (iii) if said another user device is determined as located in the vehicle, a process of storing another-authentication information in the vehicle-control supporting server wherein said another-authentication information includes the 1-st vehicle device information, the 1-st vehicle location information, the 1-st authentication-time information, another-user device information on said another user device, the location information on said another user device, time information on said another user device, and the 1-st server time information, and (iv) a process of generating and transmitting another user device certificate, another digital signature corresponding to said another user device certificate, and the 1-st vehicle device certificate to said another user device, to thereby allow said another user device to store in said another user device said another user device certificate and said another digital signature, allow said another user device to transmit the 1-st vehicle device certificate to the vehicle device and allow the vehicle device to store the 1-st vehicle device certificate.

As one example, before the process of (IV), the processor further performs: (IV0) on condition that current limit information on a registrable quantity has been set which represents the registrable quantity of appendable user devices including said another user device, if modified limit information to be used for updating the current limit information on the registrable quantity is acquired from the user device, a process of updating the current limit information on the registrable quantity by referring to the modified limit information.

As one example, at the process of (I), on condition that 1-st biometric authentication information of a user of the user device has been further registered with the vehicle, if 2-nd biometric authentication information of the user is further acquired from the user device, the processor performs a process of comparing the 1-st biometric authentication information stored in the vehicle-control supporting server with the 2-nd biometric authentication information, to thereby determine whether the user device is authorized to control the vehicle.

As one example, at the process of (II), if a 2-nd digital signature acquired from the user device is determined as invalid by comparing a creation time of the 1-st digital signature with a time stamp included in the 2-nd digital signature, the processor performs a process of blocking the 2-nd digital signature determined as invalid.

As one example, at the process of (I), the processor performs (i) a process of acquiring an expiration date of the 1-st user device certificate and that of the 1-st vehicle device certificate by referring to the issuance information on the 1-st user device certificate and the issuance information on the 1-st vehicle device certificate, and (ii) if at least one of the expiration date of the 1-st user device certificate and the expiration date of the 1-st vehicle device certificate is determined as requiring renewal, a process of allowing the user device to transmit a re-issuance request for the 1-st user device certificate or the 1-st vehicle device certificate to the vehicle-control supporting server.

In addition, recordable media that are readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
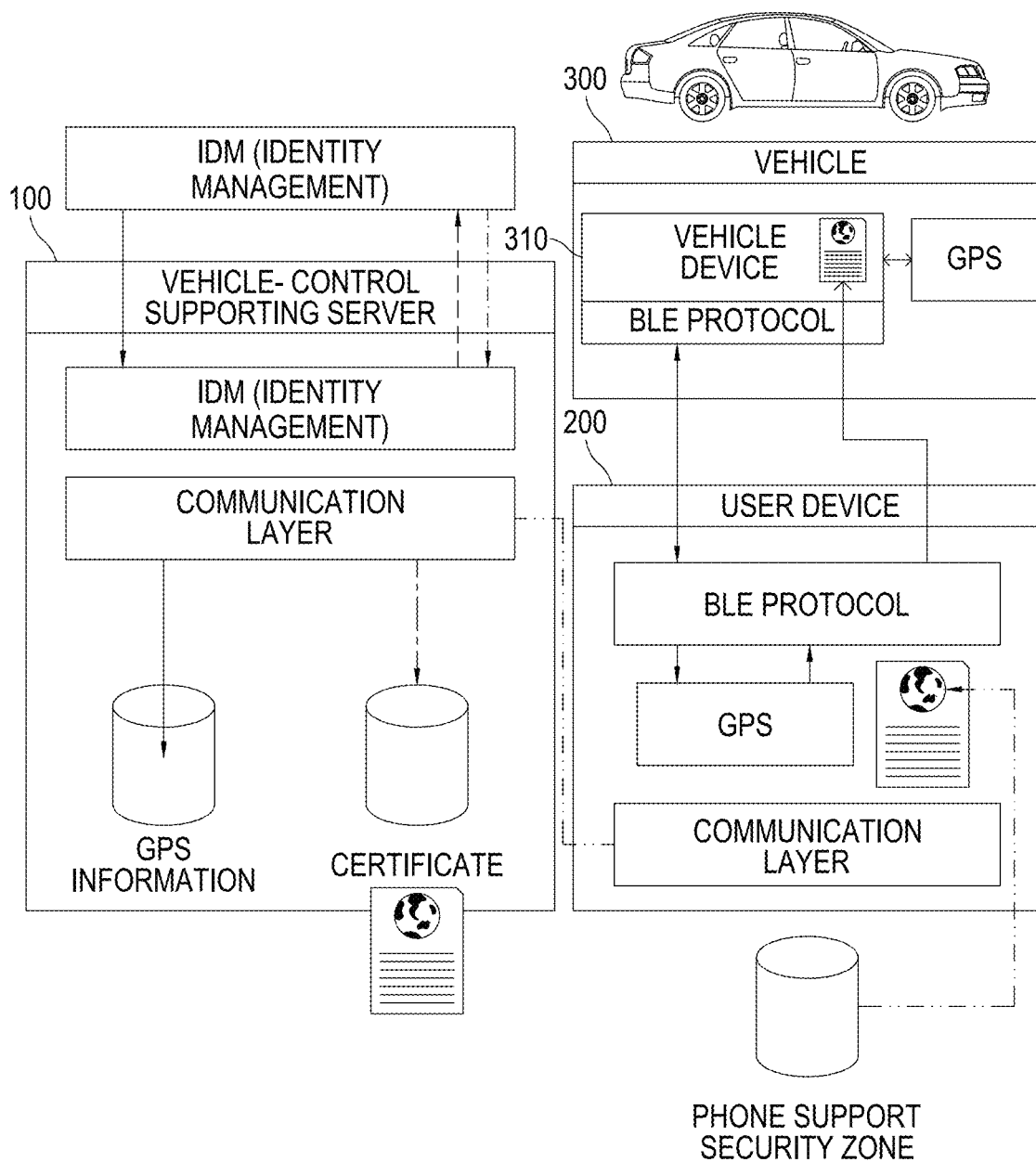
FIG. 1 is a drawing schematically illustrating a system for controlling a vehicle based on location information in accordance with one example embodiment of the present disclosure.

Detailed explanation on the present disclosure to be made below refers to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained by referring to attached diagrams in detail as shown below.

FIG. 1 is a drawing schematically illustrating a system for controlling a vehicle based on location information in accordance with one example embodiment of the present disclosure. The system for controlling the vehicle 300 may include a vehicle-control supporting server 100, the vehicle 300, and a user device 200.

First, the vehicle-control supporting server 100 may authenticate the vehicle 300 and the user device 200, and may authorize the user device 200 to control the vehicle 300 based on a location of the authenticated vehicle 300 and that of the authenticated user device 200. Also, authentication information, issuance information on a vehicle device certificate of the vehicle 300, issuance information on a user device certificate of the user device 200, vehicle location information of the vehicle 300, user-device location information of the user device 200 may be stored in the vehicle-control supporting server 100.

Figure 2:
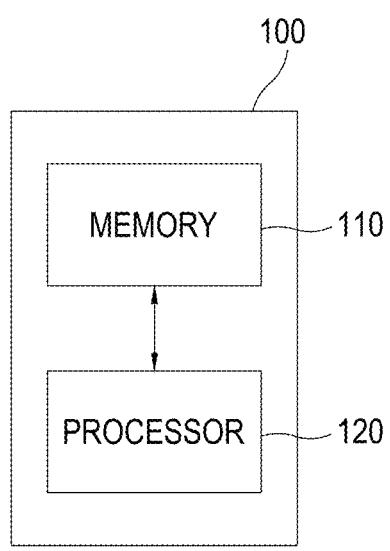
FIG. 2 is a drawing schematically illustrating a vehicle-control supporting server for controlling the vehicle based on the location information in accordance with one example embodiment of the present disclosure.

By referring to FIG. 2, the vehicle-control supporting server 100 may include a memory 110 for storing instructions to control the vehicle 300 based on the location information, and a processor 120 for performing processes of controlling the vehicle 300 based on the location information according to the instructions in the memory 110.

Specifically, the vehicle-control supporting server 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Next, the user device 200 may allow its user to remotely control the vehicle. Also, a digital signature and the user device certificate issued from the vehicle-control supporting server 100 may be stored in the user device 200, and the user device 200 may relay communication between the vehicle 300 and the vehicle-control supporting server 100.

Meanwhile, a vehicle device 310 may communicate with the user device 200 via a network using Bluetooth module, and the user device 200 may transmit information acquired from the vehicle device 310 or information of the user device 200 to the vehicle-control supporting server 100 over another network, e.g., LTE. Herein, the vehicle device 310 may be installed in the vehicle 300 and the vehicle device 310 may store the vehicle device certificate issued from the vehicle-control supporting server 100.

Figure 3:
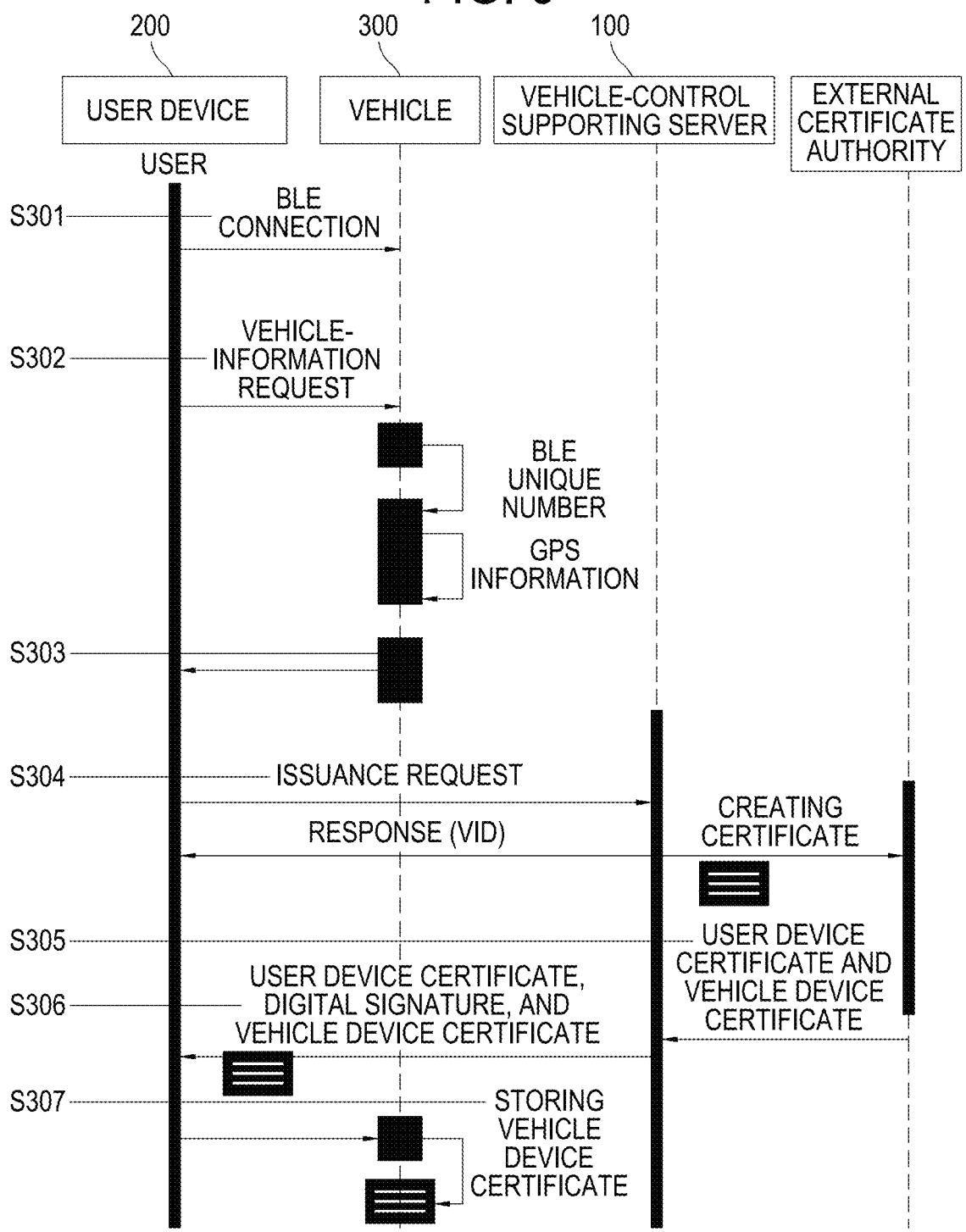
FIG. 3 is a drawing schematically illustrating a process of generating a vehicle device certificate, a user device certificate, and a digital signature corresponding to the user device certificate in the method for controlling the vehicle based on the location information in accordance with one example embodiment of the present disclosure.

Processes of registering information on the user device 200 and on the vehicle device 310, in order to control the vehicle 300 based on the location information using the system configured as such in accordance with one example embodiment of the present disclosure, are described by referring to FIG. 3.

First, the network may be established between the user device 200 and the vehicle device 310, at a step of S301. In the description below and the appended claims, a term "1-st" is added for terms related to objects or concepts that are registered or stored, etc. in advance to be used as references, and a term "2-nd" is added for terms related to objects or concepts that are presented or requested to be compared with the references, to avoid possible confusion. However, some of the terms with "1-st" or "2-nd" are written as such for consistency in presentation, although they are not used in comparison.

And, a vehicle-information request may be transmitted from the user device 200 to the vehicle device 310 at a step of S302, and in response to the vehicle-information request, the vehicle device 310 may transmit 1-st vehicle device information, 1-st vehicle location information, and 1-st authentication-time information to the user device 200, at a step of S303.

Then, the user device 200 may transmit to the vehicle-control supporting server 100 an issuance request which includes (1) the 1-st vehicle device information, the 1-st vehicle location information, and the 1-st authentication-time information received from the vehicle device 310 and (2) the 1-st user device information, the 1-st user-device location information, and the 1-st user-device time information, at a step of S304.

Herein, the network over which the communication between the user device 200 and the vehicle device 310 is performed may be a piconet using the Bluetooth module, but the scope of the present disclosure is not limited thereto, and the communication may be performed over any network using any communication devices. Similarly, the network over which the communication between the user device 200 and the vehicle-control supporting server 100 is performed may be any network using any communication devices.

Meanwhile, the 1-st vehicle location information and the 1-st user-device location information may be respectively acquired from GPS receivers included in the vehicle 300 and the user device 200.

And, if the issuance request is acquired from the user device 200, the vehicle-control supporting server 100 may determine whether the user device 200 is located in the vehicle 300 by referring to the 1-st vehicle location information and the 1-st user-device location information.

As one example, the vehicle-control supporting server 100 may determine that the user device 200 is located in the vehicle 300, if the user device 200 is determined as located within a preset distance or a preset radius from the vehicle 300 by referring to (i) the 1-st vehicle location information corresponding to the 1-st authentication-time information and (ii) the 1-st user-device location information corresponding to the 1-st user-device time information.

And, if the user device 200 is determined as located in the vehicle 300, the vehicle-control supporting server 100 may perform a process of storing at least part of the authentication information in the vehicle-control supporting server 100. Herein, the authentication information may include the 1-st vehicle device information, the 1-st vehicle location information, the 1-st authentication-time information, the 1-st user device information, the 1-st user-device location information, the 1-st user-device time information, and the 1-st server time information. Also, the vehicle-control supporting server 100 may generate the 1-st user device certificate, the 1-st digital signature corresponding to the 1-st user device certificate, and the 1-st vehicle device certificate by referring to the authentication information, at a step of S305.

Herein, the vehicle-control supporting server 100 may generate, by itself, the 1-st user device certificate, the 1-st digital signature corresponding to the 1-st user device certificate, and the 1-st vehicle device certificate. And as another example, the vehicle-control supporting server 100 may allow another authentication server to generate the 1-st user device certificate, the 1-st digital signature corresponding to the 1-st user device certificate, and the 1-st vehicle device certificate by referring to the authentication information.

And, the vehicle-control supporting server 100 may transmit the 1-st user device certificate, the 1-st digital signature corresponding to the 1-st user device certificate, and the 1-st vehicle device certificate to the user device 200. Then, the user device 200 may store in the user device 200 the 1-st user device certificate and the 1-st digital signature at a step of S306, and may transmit the 1-st vehicle device certificate to the vehicle device 310, to thereby allow the vehicle device 310 to store the 1-st vehicle device certificate at a step of S307.

Meanwhile, in order for another user device to control the vehicle 300, an issuance request for another certificate may be transmitted and received. Herein, said another user device is not the user device of an owner of the vehicle, that is, said another user device is not the registered user device. As such, if the issuance request for said another certificate to be used for the same vehicle is acquired from said another user device, the vehicle-control supporting server 100 may perform (i) a process of transmitting a confirmation request to the user device 200 which has been registered in the vehicle-control supporting server 100 as an authorized device, and (ii) if authorization information corresponding to the confirmation request is acquired from the user device 200, a process of issuing said another certificate.

That is, the vehicle-control supporting server 100 may perform (i) a process of determining whether said another user device is located in the vehicle 300 by referring to the 1-st vehicle location information and location information on said another user device, (ii) if said another user device is determined as located in the vehicle 300, a process of storing another-authentication information in the vehicle-control supporting server 100 where said another-authentication information includes the 1-st vehicle device information, the 1-st vehicle location information, the 1-st authentication-time information, another-user device information on said another user device, the location information on said another user device, time information on said another user device, and the 1-st server time information, and (iii) a process of generating and transmitting another user device certificate, another digital signature corresponding to said another user device certificate, and the 1-st vehicle device certificate to said another user device, to thereby (iii-1) allow said another user device to store, in said another user device, said another user device certificate and said another digital signature, (iii-2) allow said another user device to transmit the 1-st vehicle device certificate to the vehicle device 310 and (iii-3) allow the vehicle device 310 to store the 1-st vehicle device certificate.

Herein, the number of appendable user devices, e.g., said another user device, which can be registered with the vehicle 300 may be predetermined, and the number of the appendable user devices that can be registered in the vehicle-control supporting server 100 may be changed as the case may be. That is, on condition that current limit information on a registrable quantity has been set which represents the registrable quantity of the appendable user devices, if modified limit information to be used for updating the current limit information on the registrable quantity is acquired from the user device 200, the vehicle-control supporting server 100 may perform a process of updating the current limit information on the registrable quantity by referring to the modified limit information.

Figure 4:
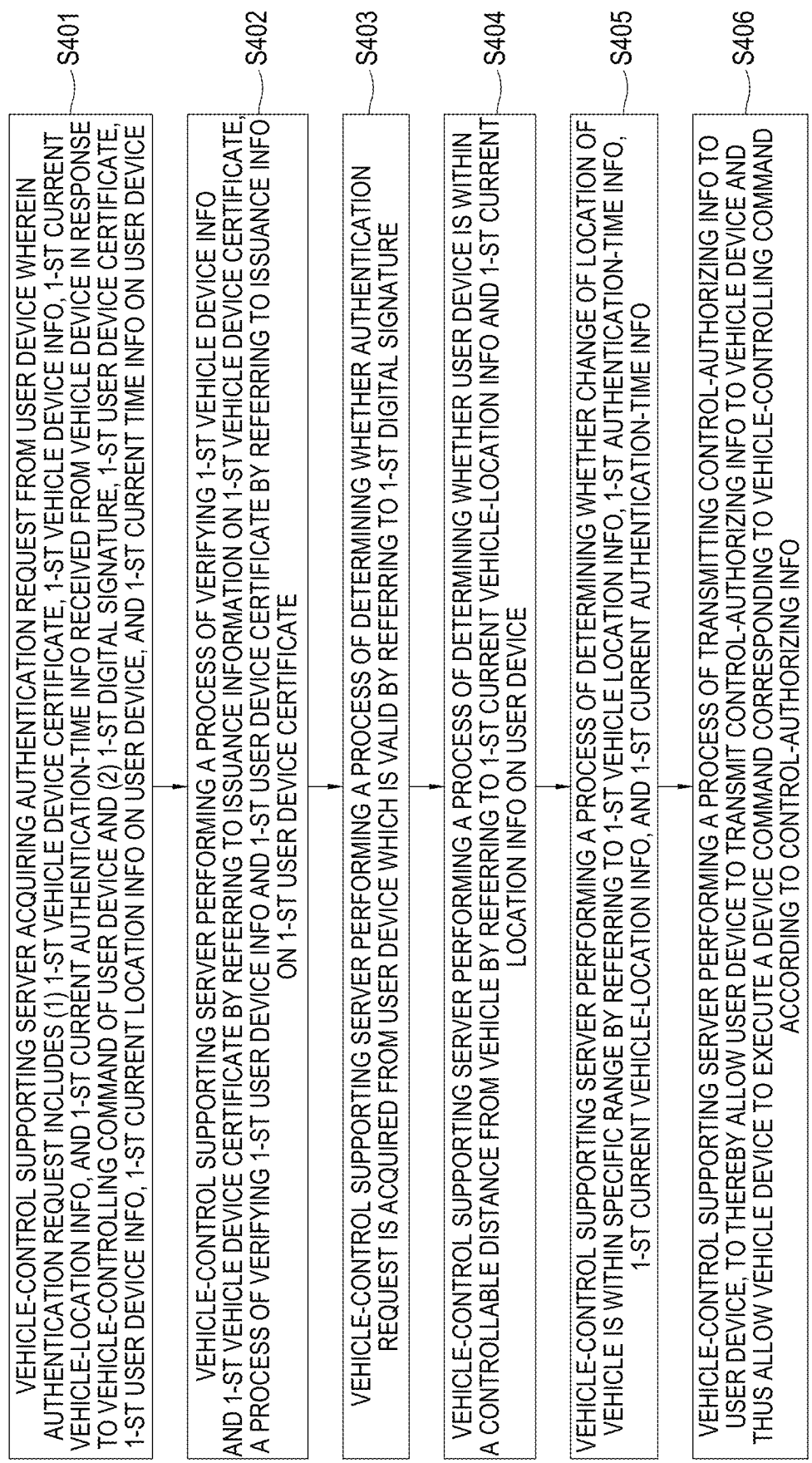
FIG. 4 is a flowchart schematically illustrating a process of controlling the vehicle based on the location information in accordance with one example embodiment of the present disclosure.

The following processes are described in detail below by referring to FIG. 4. On condition that (i) the authentication information, the issuance information on the 1-st user device certificate, and the issuance information on the 1-st vehicle device certificate have been stored in the vehicle-control supporting server 100 where the authentication information includes the 1-st vehicle device information, the 1-st vehicle location information, the 1-st authentication-time information, the 1-st user device information, the 1-st user-device location information, the 1-st user-device time information, and the 1-st server time information, (ii) the 1-st user device certificate issued from the vehicle-control supporting server 100 and the 1-st digital signature corresponding to the 1-st user device certificate have been stored in the user device 200, and (iii) the 1-st vehicle device certificate has been stored in the vehicle device 310, the vehicle-control supporting server 100 may perform a process of acquiring an authentication request from the user device 200 to be used for controlling the vehicle, and a process of transmitting the control-authentication information in response to the authentication request, according to processing of issuance of the certificate requested by the user device 200.

The user who has an intention of controlling the vehicle 300 may transmit at least one vehicle-controlling command to the vehicle device 310 by using the user device 200. Then, the vehicle device 310 may transmit the 1-st vehicle device certificate, the 1-st vehicle device information, the 1-st current vehicle-location information, and the 1-st current authentication-time information to the user device 200. Then, the user device 200 may transmit to the vehicle-control supporting server 100 the authentication request in which (1) the above-mentioned information received from the vehicle device 310 and (2) the 1-st user device certificate, the 1-st digital signature corresponding to the 1-st user device certificate, the 1-st user device information, the 1-st current location information on the user device, and the 1-st current time information on the user device are included, at a step of S401.

And, the vehicle-control supporting server 100 may perform (i) a process of verifying the 1-st vehicle device information and the 1-st vehicle device certificate by referring to the issuance information on the 1-st vehicle device certificate, (ii) a process of verifying the 1-st user device information and the 1-st user device certificate by referring to the issuance information on the 1-st user device certificate at a step of S402, and (iii) a process of determining whether the authentication request is acquired from the user device which is valid by referring to the 1-st digital signature at a step of S403.

And, the vehicle-control supporting server 100 may perform a process of determining whether the user device 200 is within a controllable distance from the vehicle 300 by referring to the 1-st current vehicle-location information and the 1-st current location information on the user device, at a step of S404. Herein, the controllable distance may be a certain distance or a certain radius from the vehicle 300 within which the user device 200 must be positioned in order to control the vehicle 300.

Also, since various reasons may cause a change of a location of the vehicle 300, for example, its parking location or its starting location, the vehicle-control supporting server 100 may determine whether the change of the location of the vehicle 300 is within a specific range by referring to (i) the 1-st vehicle location information and the 1-st authentication-time information which have been stored in the vehicle-control supporting server 100 and (ii) the 1-st current vehicle-location information and the 1-st current authentication-time information which are acquired from the user device 200, at a step of S405.

As an example, the specific range may include a range in space, representing whether the location of the vehicle 300 can change normally from a previous location corresponding to a previous authentication time into a current location corresponding to a current authentication time.

Meanwhile, separate from the controllable distance explained above, a 1-st unique distance may further be set for convenience of the user.

That is, on condition that the 1-st unique distance to be used for controlling the vehicle 300 has further been set, if the user device 200 moves inward from outside the 1-st unique distance away from the vehicle 300, the user device 200 may generate and transmit a door-opening command to the vehicle device 310 as the vehicle-controlling command. As a result, the authentication request may be transmitted to the vehicle-control supporting server 100 in response to the vehicle-controlling command, and the vehicle-control supporting server 100 may perform authentication processes as explained above.

Or, if the user device 200 moves outward from inside the 1-st unique distance, the user device 200 may generate and transmit a door-locking command to the vehicle device 310 as the vehicle-controlling command. As a result, the authentication request may be transmitted to the vehicle-control supporting server 100 in response to the vehicle-controlling command, and the vehicle-control supporting server 100 may perform the authentication processes as explained above.

Herein, the 1-st unique distance may be same as the controllable distance explained above, but the scope of the present disclosure is not limited thereto, and the 1-st unique distance may be different from the controllable distance.

Meanwhile, the authentication information explained above may further include the user's biometric authentication information.

That is, in order to strengthen a security, on condition that 1-st biometric authentication information of the user of the user device 200 has been further registered with the vehicle, if 2-nd biometric authentication information of the user is further acquired from the user device 200, the vehicle-control supporting server 100 may perform a process of comparing the 1-st biometric authentication information stored in the vehicle-control supporting server 100 with the 2-nd biometric authentication information, to thereby determine whether the user device 200 is authorized to control the vehicle 300.

Such biometric authentication information may include fingerprint information, iris information, face information, retina information, vein information, voice information, DNA pattern information, hand shape information, etc.

Meanwhile, the authentication of the user device 200 may fail due to expiration of at least one of the 1-st user device certificate and the 1-st vehicle device certificate.

Therefore, the vehicle-control supporting server 100 may perform (i) a process of acquiring an expiration date of the 1-st user device certificate and that of the 1-st vehicle device certificate by referring to the issuance information on the 1-st user device certificate and the issuance information on the 1-st vehicle device certificate, and (ii) if at least one of the expiration date of the 1-st user device certificate and that of the 1-st vehicle device certificate is determined as requiring renewal, a process of allowing the user device 200 to transmit a re-issuance request for the 1-st user device certificate or the 1-st vehicle device certificate to the vehicle-control supporting server 100.

And, (i) if the 1-st vehicle device certificate and the 1-st user device certificate are determined as valid, (ii) if the authentication request is determined as acquired from the user device which is valid, (iii) if the user device 200 is determined as within the controllable distance from the vehicle 300, and (iv) if the change of the location of the vehicle 300 is determined as within the specific range, then the vehicle-control supporting server 100 may perform a process of transmitting control-authorizing information, corresponding to the authentication request acquired from the user device 200, to the user device 200, to thereby allow the user device 200 to transmit the control-authorizing information to the vehicle device 310 and thus allow the vehicle device 310 to execute at least one device command corresponding to the vehicle-controlling command according to the control-authorizing information, at a step of S406.

Herein, if a 2-nd digital signature acquired from the user device 200 is determined as invalid, e.g., duplicated or forged, by comparing a creation time of the 1-st digital signature with a time stamp included in the 2-nd digital signature, then the vehicle-control supporting server 100 may perform a process of blocking usage of the 1-st user device certificate and the 1-st vehicle device certificate corresponding to the 2-nd digital signature determined as invalid.

For example, if an unauthorized third party makes a copy of the digital signature stored in the authorized user device and stores the copy in a user device of the unauthorized third party in order to control the vehicle 300, the time stamp corresponding to the copy is different from the creation time of the digital signature stored in the vehicle-control supporting server 100. Therefore, the vehicle-control supporting server 100 may determine the copy as duplicated or forged and may block the copy.

Meanwhile, the vehicle-control supporting server 100 may perform (i) a process of acquiring from the user device 200 2-nd current vehicle-location information, 2-nd vehicle device information, 2-nd user-device location information, and 2-nd user device information, (ii) a process of cross-validating a distance between the vehicle 300 and the user device 200 by referring to the 2-nd current vehicle-location information and the 2-nd current location information on the user device 200, (iii) if the 2-nd current vehicle-location information is determined as different from the 1-st vehicle location information included in the authentication information, a process of comparing the 2-nd vehicle device information and the 2-nd user device information with the 1-st vehicle device information and the 1-st user device information included in the authentication information, (iv) a process of determining the authentication information as valid if the 2-nd vehicle device information and the 2-nd user device information are determined as respectively identical to the 1-st vehicle device information and the 1-st user device information included in the authentication information and (v) a process of updating the 1-st vehicle location information, the 1-st authentication-time information, the 1-st user-device location information, the 1-st user-device time information, and the 1-st server time information included in the authentication information.

In case the 1-st vehicle location information and the 1-st user-device location information of the user in the vehicle 300 are being constantly changed due to moving of the vehicle 300, the vehicle-control supporting server 100 may determine that the authentication information is valid, while regarding the location information as fixed, without updating the location information that keeps being changed.

That is, the vehicle-control supporting server 100 may perform (i) a process of cross-validating a distance between the vehicle 300 and the user device 200 by referring to the 1-st current vehicle-location information and the 1-st current location information on the user device 200, and (ii) in case the vehicle 300 is determined as moving even if the 1-st current vehicle-location information and the 1-st current location information on the user device have been changed, a process of determining the authentication information as valid. Thus, without updating the location information on the vehicle 300 and the user device 200, the vehicle-control supporting server 100 may allow the user device 200 to control the vehicle 300 continuously.

The present disclosure may strengthen the security of the vehicle by adding the vehicle into the security chain using the location information on the vehicle, according to the description as above.

The present disclosure has an effect of supporting quick control of the vehicle using Bluetooth modules included in the vehicle and the user device.

The present disclosure has another effect of supporting the control of the vehicle even if the vehicle does not support network communication.

The present disclosure has still another effect of allowing easy access to vehicle-related services in an aftermarket.

The present disclosure has still yet another effect of reducing cost of generating and managing keys.

The present disclosure has still yet another effect of incorporating the vehicle into the security chain by using the location information of the vehicle.

The embodiments of the present disclosure as explained above can be implemented in a form of executable program command through a variety of computer means recordable to computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for controlling a vehicle based on location information, comprising steps of:
    (a) on condition that (i) authentication information, issuance information on a 1-st user device certificate, and issuance information on a 1-st vehicle device certificate have been stored in a vehicle-control supporting server wherein the authentication information includes 1-st vehicle device information, 1-st vehicle location information, 1-st authentication-time information, 1-st user device information, 1-st user-device location information, 1-st user-device time information, and 1-st server time information, (ii) the 1-st user device certificate issued from the vehicle-control supporting server and a 1-st digital signature corresponding to the 1-st user device certificate have been stored in the user device, and (iii) the 1-st vehicle device certificate has been stored in a vehicle device of the vehicle, and then if an authentication request is acquired from the user device wherein the authentication request includes (1) the 1-st vehicle device certificate, the 1-st vehicle device information, 1-st current vehicle-location information, and 1-st current authentication-time information received from the vehicle device in response to a vehicle-controlling command of the user device and (2) the 1-st digital signature, the 1-st user device certificate, the 1-st user device information, 1-st current location information on the user device, and 1-st current time information on the user device,
    the vehicle-control supporting server performing a process of verifying the 1-st vehicle device information and the 1-st vehicle device certificate by referring to the issuance information on the 1-st vehicle device certificate, a process of verifying the 1-st user device information and the 1-st user device certificate by referring to the issuance information on the 1-st user device certificate, a process of determining whether the authentication request is acquired from the user device which is valid by referring to the 1-st digital signature, a process of determining whether the user device is within a controllable distance from the vehicle by referring to the 1-st current vehicle-location information and the 1-st current location information on the user device, and a process of determining whether a change of a location of the vehicle is within a specific range by referring to the 1-st vehicle location information, the 1-st authentication-time information, the 1-st current vehicle-location information, and the 1-st current authentication-time information; and
    (b) (i) if the 1-st vehicle device certificate and the 1-st user device certificate are determined as valid, (ii) if the authentication request is determined as acquired from the user device which is valid, (iii) if the user device is determined as within the controllable distance from the vehicle, and (iv) if the change of the location of the vehicle is determined as within the specific range, then the vehicle-control supporting server performing a process of transmitting control-authorizing information to the user device, to thereby allow the user device to transmit the control-authorizing information to the vehicle device and thus allow the vehicle device to execute a device command corresponding to the vehicle-controlling command according to the control-authorizing information.

2. The method of claim 1, before the step of (a), further comprising a step of:
    (a0) if an issuance request is acquired from the user device wherein the issuance request includes (1) the 1-st vehicle device information, the 1-st vehicle location information, and the 1-st authentication-time information received from the vehicle device in response to a vehicle-information request by the user device and (2) the 1-st user device information, the 1-st user-device location information, and the 1-st user-device time information, the vehicle-control supporting server performing (i) a process of determining whether the user device is located in the vehicle by referring to the 1-st vehicle location information and the 1-st user-device location information, (ii) if the user device is determined as located in the vehicle, a process of storing the authentication information in the vehicle-control supporting server wherein the authentication information includes the 1-st vehicle device information, the 1-st vehicle location information, the 1-st authentication-time information, the 1-st user device information, the 1-st user-device location information, the 1-st user-device time information, and the 1-st server time information, (iii) a process of generating and transmitting the 1-st user device certificate, the 1-st digital signature corresponding to the 1-st user device certificate, and the 1-st vehicle device certificate to the user device, to thereby allow the user device to store in the user device the 1-st user device certificate and the 1-st digital signature, allow the user device to transmit the 1-st vehicle device certificate to the vehicle device, and allow the vehicle device to store the 1-st vehicle device certificate.

3. The method of claim 1, wherein, at the step of (a), on condition that a 1-st unique distance to be used for controlling the vehicle has further been set, (i) if the user device moves inward from outside the 1-st unique distance away from the vehicle, the user device generates and transmits a door-opening command to the vehicle device as the vehicle-controlling command, or (ii) if the user device moves outward from inside the 1-st unique distance, the user device generates and transmits a door-locking command to the vehicle device as the vehicle-controlling command.

4. The method of claim 1, further comprising a step of:
(c1) the vehicle-control supporting server performing a process of cross-validating a distance between the vehicle and the user device by referring to the 1-st current vehicle-location information and the 1-st current location information on the user device, and in case the vehicle is determined as moving even if the 1-st current vehicle-location information and the 1-st current location information on the user device have been changed, a process of determining the authentication information as valid.

5. The method of claim 1, further comprising a step of:
(c2) the vehicle-control supporting server performing (i) a process of acquiring from the user device 2-nd current vehicle-location information, 2-nd vehicle device information, 2-nd user-device location information, and 2-nd user device information, (ii) a process of cross-validating a distance between the vehicle and the user device by referring to the 2-nd current vehicle-location information and the 2-nd current location information on the user device, (iii) if the 2-nd current vehicle-location information is determined as different from the 1-st vehicle location information included in the authentication information, a process of comparing the 2-nd vehicle device information and the 2-nd user device information with the 1-st vehicle device information and the 1-st user device information included in the authentication information, (iv) a process of determining the authentication information as valid if the 2-nd vehicle device information and the 2-nd user device information are determined as respectively identical to the 1-st vehicle device information and the 1-st user device information included in the authentication information and (v) a process of updating the 1-st vehicle location information, the 1-st authentication-time information, the 1-st user-device location information, the 1-st user-device time information, and the 1-st server time information included in the authentication information.

6. The method of claim 1, further comprising a step of:
(d) if an issuance request for another certificate to be used for the vehicle is acquired from another user device, the vehicle-control supporting server performing (i) a process of transmitting a confirmation request to the user device, and (ii) if authorization information corresponding to the confirmation request is acquired from the user device, a process of determining whether said another user device is located in the vehicle by referring to the 1-st vehicle location information and location information on said another user device, (iii) if said another user device is determined as located in the vehicle, a process of storing another-authentication information in the vehicle-control supporting server wherein said another-authentication information includes the 1-st vehicle device information, the 1-st vehicle location information, the 1-st authentication-time information, another-user device information on said another user device, the location information on said another user device, time information on said another user device, and the 1-st server time information, and (iv) a process of generating and transmitting another user device certificate, another digital signature corresponding to said another user device certificate, and the 1-st vehicle device certificate to said another user device, to thereby allow said another user device to store in said another user device said another user device certificate and said another digital signature, allow said another user device to transmit the 1-st vehicle device certificate to the vehicle device and allow the vehicle device to store the 1-st vehicle device certificate.

7. The method of claim 6, before the step of (d), further comprising a step of:
(d0) on condition that current limit information on a registrable quantity has been set which represents the registrable quantity of appendable user devices including said another user device, if modified limit information to be used for updating the current limit information on the registrable quantity is acquired from the user device, the vehicle-control supporting server performing a process of updating the current limit information on the registrable quantity by referring to the modified limit information.

8. The method of claim 1, wherein, at the step of (a), on condition that 1-st biometric authentication information of a user of the user device has been further registered with the vehicle, if 2-nd biometric authentication information of the user is further acquired from the user device, the vehicle-control supporting server performs a process of comparing the 1-st biometric authentication information stored in the vehicle-control supporting server with the 2-nd biometric authentication information, to thereby determine whether the user device is authorized to control the vehicle.

9. The method of claim 1, wherein, at the step of (b), if a 2-nd digital signature acquired from the user device is determined as invalid by comparing a creation time of the 1-st digital signature with a time stamp included in the 2-nd digital signature, the vehicle-control supporting server performs a process of blocking the 2-nd digital signature determined as invalid.

10. The method of claim 1, wherein, at the step of (a), the vehicle-control supporting server performs (i) a process of acquiring an expiration date of the 1-st user device certificate and that of the 1-st vehicle device certificate by referring to the issuance information on the 1-st user device certificate and the issuance information on the 1-st vehicle device certificate, and (ii) if at least one of the expiration date of the 1-st user device certificate and the expiration date of the 1-st vehicle device certificate is determined as requiring renewal, a process of allowing the user device to transmit a re-issuance request for the 1-st user device certificate or the 1-st vehicle device certificate to the vehicle-control supporting server.

11. A vehicle-control supporting server for controlling a vehicle based on location information, comprising:
   at least one memory that stores instructions; and
   at least one processor configured to execute the instructions to perform: (I) on condition that (i) authentication information, issuance information on a 1-st user device certificate, and issuance information on a 1-st vehicle device certificate have been stored in the vehicle-control supporting server wherein the authentication information includes 1-st vehicle device information, 1-st vehicle location information, 1-st authentication-time information, 1-st user device information, 1-st user-device location information, 1-st user-device time information, and 1-st server time information, (ii) the 1-st user device certificate issued from the vehicle-control supporting server and a 1-st digital signature corresponding to the 1-st user device certificate have been stored in the user device, and (iii) the 1-st vehicle device certificate has been stored in a vehicle device of the vehicle, and then if an authentication request is acquired from the user device wherein the authentication request includes (1) the 1-st vehicle device certificate, the 1-st vehicle device information, 1-st current vehicle-location information, and 1-st current authentication-time information received from the vehicle device in response to a vehicle-controlling command of the user device and (2) the 1-st digital signature, the 1-st user device certificate, the 1-st user device information, 1-st current location information on the user device, and 1-st current time information on the user device, a process of verifying the 1-st vehicle device information and the 1-st vehicle device certificate by referring to the issuance information on the 1-st vehicle device certificate, a process of verifying the 1-st user device information and the 1-st user device certificate by referring to the issuance information on the 1-st user device certificate, a process of determining whether the authentication request is acquired from the user device which is valid by referring to the 1-st digital signature, a process of determining whether the user device is within a controllable distance from the vehicle by referring to the 1-st current vehicle-location information and the 1-st current location information on the user device, and a process of determining whether a change of a location of the vehicle is within a specific range by referring to the 1-st vehicle location information, the 1-st authentication-time information, the 1-st current vehicle-location information, and the 1-st current authentication-time information, and (II) (i) if the 1-st vehicle device certificate and the 1-st user device certificate are determined as valid, (ii) if the authentication request is determined as acquired from the user device which is valid, (iii) if the user device is determined as within the controllable distance from the vehicle, and (iv) if the change of the location of the vehicle is determined as within the specific range, then a process of transmitting control-authorizing information to the user device, to thereby allow the user device to transmit the control-authorizing information to the vehicle device and thus allow the vehicle device to execute a device command corresponding to the vehicle-controlling command according to the control-authorizing information.

12. The vehicle-control supporting server of claim 11, wherein, before the process of (I), the processor further performs:
   (I-0) if an issuance request is acquired from the user device wherein the issuance request includes (1) the 1-st vehicle device information, the 1-st vehicle location information, and the 1-st authentication-time information received from the vehicle device in response to a vehicle-information request by the user device and (2) the 1-st user device information, the 1-st user-device location information, and the 1-st user-device time information, (i) a process of determining whether the user device is located in the vehicle by referring to the 1-st vehicle location information and the 1-st user-device location information, (ii) if the user device is determined as located in the vehicle, a process of storing the authentication information in the vehicle-control supporting server wherein the authentication information includes the 1-st vehicle device information, the 1-st vehicle location information, the 1-st authentication-time information, the 1-st user device information, the 1-st user-device location information, the 1-st user-device time information, and the 1-st server time information, (iii) a process of generating and transmitting the 1-st user device certificate, the 1-st digital signature corresponding to the 1-st user device certificate, and the 1-st vehicle device certificate to the user device, to thereby allow the user device to store in the user device the 1-st user device certificate and the 1-st digital signature, allow the user device to transmit the 1-st vehicle device certificate to the vehicle device, and allow the vehicle device to store the 1-st vehicle device certificate.

13. The vehicle-control supporting server of claim 11, wherein, at the process of (I), on condition that a 1-st unique distance to be used for controlling the vehicle has further been set, (i) if the user device moves inward from outside the 1-st unique distance away from the vehicle, the user device generates and transmits a door-opening command to the vehicle device as the vehicle-controlling command, or (ii) if the user device moves outward from inside the 1-st unique distance, the user device generates and transmits a door-locking command to the vehicle device as the vehicle-controlling command.

14. The vehicle-control supporting server of claim 11, wherein the processor further performs:
   (III-1) a process of cross-validating a distance between the vehicle and the user device by referring to the 1-st current vehicle-location information and the 1-st current location information on the user device, and in case the vehicle is determined as moving even if the 1-st current vehicle-location information and the 1-st current location information on the user device have been changed, a process of determining the authentication information as valid.

15. The vehicle-control supporting server of claim 11, wherein the processor further performs:
(III-2) (i) a process of acquiring from the user device 2-nd current vehicle-location information, 2-nd vehicle device information, 2-nd user-device location information, and 2-nd user device information, (ii) a process of cross-validating a distance between the vehicle and the user device by referring to the 2-nd current vehicle-location information and the 2-nd current location information on the user device, (iii) if the 2-nd current vehicle-location information is determined as different from the 1-st vehicle location information included in the authentication information, a process of comparing the 2-nd vehicle device information and the 2-nd user device information with the 1-st vehicle device information and the 1-st user device information included in the authentication information, (iv) a process of determining the authentication information as valid if the 2-nd vehicle device information and the 2-nd user device information are determined as respectively identical to the 1-st vehicle device information and the 1-st user device information included in the authentication information and (v) a process of updating the 1-st vehicle location information, the 1-st authentication-time information, the 1-st user-device location information, the 1-st user-device time information, and the 1-st server time information included in the authentication information.

16. The vehicle-control supporting server of claim 11, wherein the processor further performs:
(IV) if an issuance request for another certificate to be used for the vehicle is acquired from another user device, (i) a process of transmitting a confirmation request to the user device, and (ii) if authorization information corresponding to the confirmation request is acquired from the user device, a process of determining whether said another user device is located in the vehicle by referring to the 1-st vehicle location information and location information on said another user device, (iii) if said another user device is determined as located in the vehicle, a process of storing another-authentication information in the vehicle-control supporting server wherein said another-authentication information includes the 1-st vehicle device information, the 1-st vehicle location information, the 1-st authentication-time information, another-user device information on said another user device, the location information on said another user device, time information on said another user device, and the 1-st server time information, and (iv) a process of generating and transmitting another user device certificate, another digital signature corresponding to said another user device certificate, and the 1-st vehicle device certificate to said another user device, to thereby allow said another user device to store in said another user device said another user device certificate and said another digital signature, allow said another user device to transmit the 1-st vehicle device certificate to the vehicle device and allow the vehicle device to store the 1-st vehicle device certificate.

17. The vehicle-control supporting server of claim 16, wherein, before the process of (IV), the processor further performs:
(IV0) on condition that current limit information on a registrable quantity has been set which represents the registrable quantity of appendable user devices including said another user device, if modified limit information to be used for updating the current limit information on the registrable quantity is acquired from the user device, a process of updating the current limit information on the registrable quantity by referring to the modified limit information.

18. The vehicle-control supporting server of claim 11, wherein, at the process of (I), on condition that 1-st biometric authentication information of a user of the user device has been further registered with the vehicle, if 2-nd biometric authentication information of the user is further acquired from the user device, the processor performs a process of comparing the 1-st biometric authentication information stored in the vehicle-control supporting server with the 2-nd biometric authentication information, to thereby determine whether the user device is authorized to control the vehicle.

19. The vehicle-control supporting server of claim 11, wherein, at the process of (II), if a 2-nd digital signature acquired from the user device is determined as invalid by comparing a creation time of the 1-st digital signature with a time stamp included in the 2-nd digital signature, the processor performs a process of blocking the 2-nd digital signature determined as invalid.

20. The vehicle-control supporting server of claim 11, wherein, at the process of (I), the processor performs (i) a process of acquiring an expiration date of the 1-st user device certificate and that of the 1-st vehicle device certificate by referring to the issuance information on the 1-st user device certificate and the issuance information on the 1-st vehicle device certificate, and (ii) if at least one of the expiration date of the 1-st user device certificate and the expiration date of the 1-st vehicle device certificate is determined as requiring renewal, a process of allowing the user device to transmit a re-issuance request for the 1-st user device certificate or the 1-st vehicle device certificate to the vehicle-control supporting server.

* * * * *